United States Patent [19]

Shono et al.

[11] 4,391,619

[45] Jul. 5, 1983

[54] AIR NOZZLE APPARATUS FOR USE IN DRAWING GLASS FIBERS

[75] Inventors: Hiroaki Shono; Toshiaki Kikuchi, both of Fukushima, Japan

[73] Assignee: Nitto Boseki Co., Ltd., Fukushima, Japan

[21] Appl. No.: 421,908

[22] Filed: Sep. 23, 1982

[30] Foreign Application Priority Data

Oct. 14, 1981 [JP] Japan .................................. 56-163647
Oct. 14, 1981 [JP] Japan .................................. 56-163648
Oct. 15, 1981 [JP] Japan .................................. 56-164474
Oct. 15, 1981 [JP] Japan .................................. 56-164475
Oct. 15, 1981 [JP] Japan .................................. 56-164476

[51] Int. Cl.³ .......................................... C03B 37/025
[52] U.S. Cl. ........................................ 65/12; 239/498
[58] Field of Search ..................... 65/1, 2, 12; 239/498

[56] References Cited

U.S. PATENT DOCUMENTS 3,905,790  9/1975  Strickland ................................ 65/2
3,986,853 10/1976  Coggin et al. ........................... 65/2
4,003,731  1/1977  Thompson ............................... 65/12
4,149,865  4/1979  Coggin et al. ........................... 65/1
4,159,200  6/1979  Shono et al. ............................ 65/12
4,194,895  3/1980  Thompson ................................ 65/2
4,202,680  5/1980  Thompson ............................... 65/12

FOREIGN PATENT DOCUMENTS

533552 10/1976 U.S.S.R. ................................. 65/12

*Primary Examiner*—Robert L. Lindsay, Jr.
*Attorney, Agent, or Firm*—Norbert P. Holler; Charles A. Blank

[57] ABSTRACT

An air nozzle apparatus for directing air flow against the undersurface of an orifice plate of a glass fiber drawing forehearth, having an air introducing section having a manifold formed with at least one air supply port, and an air nozzle section formed with a plurality of nozzle channels communicating with the manifold. The air nozzle section has a plurality of nozzle ribs of substantially the same shape each having opposed side surfaces and opposed end edge portions. The plurality of nozzle ribs are arranged to have their side surfaces located in adjacent relationship to provide a nozzle block. Each nozzle rib is formed on at least one of the opposed side surfaces with a longitudinally extending recess which defines one of the plurality of nozzle channels between the adjacent nozzle ribs.

18 Claims, 10 Drawing Figures

AIR NOZZLE APPARATUS FOR USE IN DRAWING GLASS FIBERS

BACKGROUND OF THE INVENTION

This invention relates to air nozzle apparatus for use in drawing glass fibers, and more particularly it is concerned with an air nozzle apparatus for directing air flow against the undersurface of an orifice plate of a glass fiber drawing forehearth.

Heretofore, methods have been known for drawing glass fibers through an orifice plate by directing air flow against the undersurface of the orifice plate of a glass fiber drawing forehearth, and typical of such method is shown in U.S. Pat. No. 3,905,790, for example. The method disclosed in this document relates to drawing of glass fibers through the orifice plate of flat undersurface at which cones of molten glass are formed as molten glass flows through orifices which are formed close to one another to such an extent that the cones are likely to join one another to wet the undersurface of the orifice plate to cause flooding of the undersurface to occur, and contemplates, in such drawing of glass fibers, directing bulk flow of air against the undersurface of the orifice plate to reach the undersurface of the orifice plate in order to stabilize the cones and cool same as well as to eliminate stagnant gas that might remain in close proximity to the orifice plate and to supply gas to compensate for the gas that is carried away downwardly by the drawn fibers. This method can also have application in the production of glass fibers by means of what is generally referred to as a tip nozzle plate.

One example of the air nozzle apparatus suitable for use in directing air flow against the undersurface of the orifice plate in carrying out the aforesaid glass fiber drawing method is disclosed in U.S. Pat. No. 3,986,853. This air nozzle apparatus comprises a plurality of inlet pipes for introducing air into the nozzle apparatus under uniform pressure, an air nozzle body into which the air is introduced through the inlet pipes, and a single continuous aperture for directing an air current against the orifice plate.

Some disadvantages are associated with the air nozzle apparatus disclosed in this U.S. patent. The single aperture for directing the air flow against the undersurface of the orifice plate is large in dimension, so that the air flow directed against the undersurface of the orifice plate has its pressure reduced and makes it impossible to achieve the desired cooling effect because air presure, rather than the volume of air, is instrumental in achieving cooling satisfactorily. If an attempt is made to increase the air volume to provide improved cooling effect, then the incidence of a break-out of the filaments increases.

To obviate the aforesaid disadvantages of the prior art, an air nozzle apparatus shown in U.S. Pat. No. 4,159,200 has been developed. This air nozzle apparatus comprises a plurality of independent tubular nozzles secured by a fixing member in spaced-apart relation in a single row. By using the plurality of tubular nozzles which are independent of and separate from one another in place of the single air outlet aperture of a large dimension, the air nozzle apparatus has succeeded in providing improved cooling effect by raising the pressure of the air flow directed against the undersurface of the orifice plate.

U.S. Pat. no. 4,149,865 discloses an air nozzle apparatus which, like the air nozzle apparatus disclosed in U.S. Pat. No. 4,159,200, comprises a plurality of independent tubular nozzles arranged in spaced-apart relation in one row. Additionally, the air nozzle apparatus comprises valve means mounted in each of channels connecting the tubular nozzles to a manifold to control the flow rate of air through each channel independently. Like the air nozzle apparatus disclosed in U.S. Pat. No. 4,159,200, the air nozzle apparatus disclosed in U.S. Pat. No. 4,149,865 can achieve improved cooling effect as compared with the air nozzle apparatus shown in U.S. Pat. No. 3,986,853 in that the air flow is ejected through a plurality of tubular nozzles which are independent of and separate from one another.

In each of the air nozzle apparatus described hereinabove, the use of tubular nozzles (pipes) as nozzle elements make it necessary to form bores in a fixing member or a support block in suitable positions to firmly secure them in place. This makes it necessary to provide a boundary wall of a predetermined thickness between the bores to obtain necessary strength for securing and supporting the tubular nozzles. Also, attention has to be paid to the fact that the tubular nozzles themselves have a thickness of their own. Thus, it is impossible to reduce the spacing between the nozzle channels of the adjacent tubular nozzles below a predetermined level, so that the construction of the air nozzle apparatus does not lend itself to the purpose of achieving improved cooling effect by increasing the density of the number of air currents ejected through the tubular nozzles. Also it is a time-consuming operation to fabricate and assemble the air nozzle apparatus of such a construction.

U.S. Pat. No. 4,159,200 also discloses the technical concept of imparting an elliptic cross-sectional shape to the tubular nozzles and arranging the tubular nozzles of this cross-sectional shape in such a manner that the minor dimension of the ellipsis is parallel to the longitudinal direction of the orifice plate, so as to enable uniform cooling effect to be achieved over a wide range widthwise of the orifice plate which is aligned with the direction of the major dimension of the ellipsis of the tubular nozzles. This technical concept can have application in U.S. Pat. No. 4,149,865 as well. In this case, as viewed lengthwise of the orifice plate, the tubular nozzles can be increased in number because they are elliptic in cross-sectional shape thereby to increase the density of the number of the air currents. However, the fact remains unaltered that the tubular nozzles (pipes) are used, so that the problem that the aforesaid limitations placed on the construction interferes with the increase in the density of the number of the air currents still remains unsolved.

To form tubular nozzles of an elliptic cross-sectional shape, it is necessary, as disclosed in U.S. Pat. No. 4,159,200 to flatten tubes by means of a press or to render tubes into elliptic tubes by heating same by means of a burner over a die. The production is thus troublesome and time-consuming, and there are limits to the cross-sectional shapes that can be selected, making it difficult to obtain a desired cross-sectional shape in a nozzle. When tubes are deformed into tubular nozzles of an elliptic cross-sectional shape, it is necessary to form, on a fixing member or a support block for securing same in place, bores of the same shape as the cross-sectional shape of the tubular nozzles. Forming bores of a shape other than the circular shape is a rather difficult operation to perform, thereby making it difficult to fabricate and assemble the air nozzle apparatus.

In U.S. Pat. No. 4,149,865, the valve means comprises a valve core of a cylindrical shape inserted in a valve bore crossing the valve channel for longitudinal and rotational movement in the valve bore, the valve core being formed thereacross with an opening of substantially the same diameter as the valve channel so as to enable same to be aligned with the valve channel by the longitudinal and rotational movement of the valve core, and means for manipulating the valve core from outside for longitudinal and rotational movement thereof. The valve means of this construction enables the operator to effect fine adjustments of the flow rate of the air current ejected through the nozzle channel of each tubular nozzle while observing the drawing of molten glass directly in the vicinity of the orifice plate instead of performing remote control of the flow rate of the air currents, thereby achieving the good effect in cooling the orifice plate.

However, the valve means shown in U.S. Pat. No. 4,149,865 makes it necessary to form in the substantially cylindrical valve core the opening which crosses the valve core. To allow the air current to flow smoothly to the nozzle channel, it is not desirable that the valve channel be smaller in diameter than the nozzle channel, and the opening formed in the valve core should not also be smaller than the nozzle channel in diameter. Thus, the valve core should have a sufficiently large diameter to allow such opening to be formed therein, and this makes it difficult to obtain compact size of the valve means and reduce the spacing interval between the adjacent valve means below a predetermined level. Thus, the spacing interval between the adjacent nozzle channels or the adjacent tubular nozzles also cannot be made smaller than a predetermined level, so that the construction does not lend itself to the purpose of increasing the cooling effect by increasing the density of the number of air currents each flowing through one of the nozzle channels.

In the nozzle apparatus shown in U.S. Pat. No. 4,149,865, the valve means each mounted for one of the nozzle channels are arranged in one row. This also makes it necessary to provide a relatively large space for mounting the valve means, and makes it impossible to reduce the spacing interval between the adjacent nozzle channels, placing limitations on realization of uniform cooling of the orifice plate by increasing the density of the number of the air currents ejected through the nozzle channels.

Another problem raised by the air nozzle apparatus of U.S. Pat. No. 4,149,865 is that, in order to avoid contact between the manipulating portion of the valve means for manipulating same from outside and glass filaments being drawn through the orifices of the orifice plate, the air nozzle apparatus has to be mounted in a manner to tilt with respect to the surface of the orifice plate.

More specifically, an air nozzle apparatus is generally arranged to have its length coincide with the length of the orifice plate and located rearwardly of a group of filaments being drawn in such a manner that the manipulating portion of each valve means for actuating same from outside is directed toward the filaments, and the manipulation of the valve is carried out from the side of an operation passageway located opposite the air nozzle apparatus with respect to the group of filaments. The manipulation portion of each valve means for actuating same from outside comprises a projection located below the air nozzle section. Thus, to avoid contact between the projection and the filament, it is inevitable that the air nozzle apparatus be mounted in a tilting position with respect to the surface of the orifice plate.

However, the arrangement whereby the air nozzle apparatus is mounted in the aforesaid tilting position raises the problem that achieving of uniform cooling of the orifice plate is interfered with. More specifically, when glass filaments are formed by drawings molten glass through the orifices in the orifice plate, ambient air is drawn by rapid movement of the glass filament so that induced air currents directed toward the group of glass filaments being drawn are formed in the vicinity of the orifice plate. These induced air currents impinge on air flow which is directed from the air nozzles against the undersurface of the orifice plate and changes the direction of the air flow as it strikes the undersurface of the orifice plate to escape toward the periphery of the orifice plate. If the air nozzles are greatly tilting, a horizontal component of the air current increases and the air flows from the rear of the orifice plate toward the front thereof. The air current joins the induced air currents to form a strong horizontal air current, so that overcooling of the glass cones located in the rear of the orifice plate results which causes a break-out of the filaments to occur. Thus, to minimize adverse effects of the induced air currents and achieve uniform cooling of the orifice plate, the air nozzle apparatus is preferably mounted in a manner to be substantially perpendicular to the undersurface of the orifice plate as much as possible.

SUMMARY OF THE INVENTION

A principal object of this invention is to provide an air nozzle apparatus for directing air flow against the undersurface of the orifice plate of a glass fiber drawing forehearth which allows the density of the number of air currents ejected through the air nozles to be readily increased, which permits the cross-sectional shape of each nozzle to be freely selected, and which is easy to construct and assemble.

Another object is to provide an air nozzle apparatus of the type described and provided with a plurality of valve means for effecting fine adjustments of the flow rate of air currents through the nozzle channels of the nozzle apparatus individually which enables each valve means to be made compact in size so that the valve means are not interfering with an increase in the density of the number of air currents directed against the undersurface of the orifice plate.

Still another object is to provide an air nozzle apparatus of the type described and provided with a plurality of valve means for effecting fine adjustments of the flow rate of air currents through the nozzle channels individually which enables arrangement of the valve means for increasing the number thereof to be achieved so that the valve means arrangement is not interfering with a decrease in the spacing interval between the adjacent nozzle channels to allow the nozzle channesl to be arranged close to one another.

A further object is to provide an air nozzle apparatus of the type described and provided with a plurality of valve means for effecting fine adjustments of the flow rate of air currents through the nozzle channels individually which allows the apparatus to be mounted substantially perpendicularly to the undersurface of the orifice plate without being hampered by the existence of manipulating portions of the valve means for actuating same from outside.

According to the invention, there is provided an air nozzle apparatus for directing air flow against the undersurface of an orifice plate of a glass fiber drawing forehearth, comprising an air introducing section including a manifold formed with at least one air supply port, and an air nozzle section formed with a plurality of nozzle channels communicating with the manifold, the air nozzle section including a plurality of nozzle ribs of substantially the same shape each having opposed side surfaces and opposed end edge portions, the plurality of nozzle ribs being arranged to have their side surfaces located in adjacent relationship to provide a nozzle block, the nozzle ribs each being formed on at least one of the opposed side surfaces with a longitudinally extending recess which defines one of the plurality of nozzle channels between the adjacent nozzle ribs.

In a preferred embodiment of the invention, the nozzle ribs of the air nozzle section of the air nozzle apparatus each include first and second complementary interfitting means formed on the respective opposite side surfaces of each nozzle rib, the first and second interfitting means on the adjacent side surfaces of the adjacent nozzle ribs being in engagement with each other to integrate the nozzle ribs into the nozzle block. The first and second interfitting means preferably comprise perpendicularly stepped portions formed in close proximity to edge portions of the opposed side surfaces of the each nozzle rib. Preferably the recess is formed on each of the opposite side surfaces of the each nozzle rib. The each nozzle channel defined by the recess of the adjacent nozzle ribs preferably has an elongated cross-sectional shape oriented in the same direction as the side surfaces of the nozzle ribs.

The air nozzle section of the air nozzle apparatus preferably further includes means for rigidly holding in place the nozzle block, the holding means including a pair of keep plates located on opposed sides of the nozzle block, a pair of clamp plates located at opposed end edge portions of the nozzle block and connected to the keep plates in the form of a box surrounding the nozzle block, and screw members threadably engaged in threaded apertures formed in the clamp plates to engage end faces of the nozzle block at their forward ends to clamp against same.

In another preferred embodiment, the air nozzle section of the air nozzle apparatus further includes a pair of parallel guide plates located adjacent the opposed end edge portions of the nozzle ribs arranged to have their side surfaces located in adjacent relation, the nozzle ribs and the guide plates including first and second complementary interfitting means formed at the end edge portions of the each nozzle rib and on the inner surface of each guide plate, respectively, the first and second interfitting means being in engagement with each other to integrate the nozzle ribs into the nozzle block. The first interfitting means preferably comprises a square projection formed at each end portion of the each nozzle rib and the second interfitting means preferably comprises a complementary square recess formed on the inner surface of the each guide plate. The recess is preferably formed on each of the side surfaces of the nozzle ribs. Each nozzle channel defined by the recess of the adjacent nozzle ribs has preferably an elongated cross-sectional shape oriented in the same direction as the side surfaces of the nozzle ribs.

The air nozzle section of the air nozzle apparatus preferably further includes means for rigidly holding in place the nozzle block, the holding means including a pair of clamp plates located on opposed sides of the nozzle block, a pair of keep plates located at opposed end edge portions of the nozzle block and connected to the clamp plates in the form of a box surrounding the nozzle block, and screw members threadably engaged in threaded apertures formed in the clamp plates to engage at their forward ends the outer surfaces of the guide plates of the nozzle block to clamp against same.

The air nozzle apparatus of the aforesaid construction preferably further comprises a valve section interposed between the air introducing section and the air nozzle section, the valve section including a valve block formed with a plurality of valve channels each allowing the manifold to communicate with one of the plurality of nozzle channels, and a plurality of valve means each associated with one of the valve channels, the valve means each including a valve bore formed in the valve block in a manner to cross the corresponding valve channel, and a needle valve threadably inserted in the each valve bore, the needle valves ach having a head portion capable of being manipulated from outside to actuate the needle valves. The valve means each preferably include a coil spring mounted between the valve block and the head portion of the each needle valve. The head portion of the each needle valve is preferably formed with an opening for allowing the head portion to be manipulated by means of a wrench. The manifold is preferably divided into a plurality of compartments by means of partition plates, the compartments each being formed with the air supply port.

In the air nozzle apparatus of the aforesaid construction, the plurality of valve means are preferably arranged in two rows in staggered relation.

The air nozzle apparatus of the aforesaid construction preferably further comprises a guide section interposed between the valve section and the air nozzle section, the valve section comprising a valve block formed with a plurality of valve channels communicating with the manifold, and a plurality of valve means each associated with one of the valve channels and each having a manipulating portion for manipulating said valve means from outside, and the guide section including a guide block formed with a plurality of guide channels each allowing one of the plurality of valve channels to communicate with one of the plurality of nozzle channels, each guide channel being arranged such that an inlet portion thereof on the valve channel side is displaced from an outlet portion thereof on the nozzle channel side in a direction going toward the valve channel from the manipulating portion of the valve means.

DETAILED DESCRIPTION OF THE PREFERRED EMBODIMENTS

Figure 1:
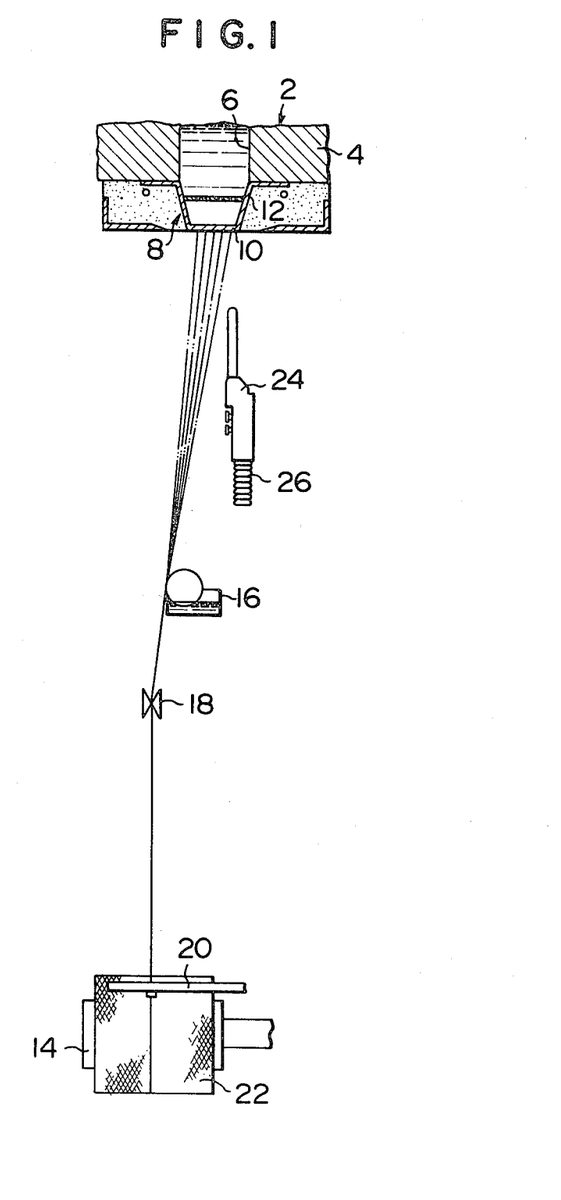
FIG. 1 is a view in explanation of the manner of operation of the air nozzle apparatus according to the invention as used with a glass fiber drawing system shown in a sectional side view.

Preferred embodiments of the air nozzle apparatus in conformity with the invention will now be described by referring to the accompanying drawings. FIG. 1 shows the air nozzle apparatus according to the invention in operation with a glass fiber drawing system shown in a sectional side view. In the figure, the numeral 2 designates a glass fiber drawing forehearth in which molten glass is conditioned to have a predetermined temperature level. The molten glass in this condition flows through a channel 6 formed in a refractory member 4 into a bushing 8 formed of a platinum alloy which is located below the channel 6. The bushing 8 includes an orifice plate 10 formed with a multipilicity of orifices opening at its undersurface, and side wall plates 12 from the orifice plate 10 in the form of a box. The bushing 8 is equipped with a pair of terminals for flowing a current of low voltage and high value under control located on the side wall plates 12, usually on the outer wall surfaces of the side wall plates 12 on the widthwise side of the bushing 8. By passing a current from the terminals mainly to the orifice plate 10 and in part to the side wall plates 12, Jule heat can be generated in the side wall plates 12 formed of a platinum alloy to raise the temperature of the bushing as a whole, particularly the temperature of the orifice plate 10, so as to avoid a drop in the temperature of the molten glass and control its temperature to a level suiting glass fiber drawing. The control is generally effected by means of a loop using as an input signal a thermo-electromotive force generated by a thermocouple welded to the side wall plates 12 of the bushing 8 to control the current passed thereto to keep the temperature of the bushing 8 constant.

In the embodiment shown, the orifice plate 10 is of the type disclosed in U.S. Pat. No. 3,905,790 having a flat undersurface and formed with a multiplicity of orifices oepning thereat and arranged close to one another. However, the invention is not limited to this type of orifice plate and the orifice plate 10 may include a tip nozzle plate formed with a multiplicity of tip nozzles projecting downwardly on the undersurface of the plate.

The molten glass flowing through the orifices of the orifice plate 10 are drawn by a winder 14 and attenuated into filaments while forming a multiplicity of cones at the outlets of the orifices on the undersurface of the orifice plate 10, the filaments being applied with a binder compound by an applicator roll of a binder applicator 16. The filaments are collected into one or a plurality of strands by a gathering shoe 18 and wound on a winding mechanism 14 while being traversed by traverse means 20 to provide a package 22.

The numeral 24 designates an air nozzle apparatus according to the invention for directing air flow against the undersurface of the orifice plate 10 to cool the undersurface of the orifice plate 10 to stabilize and cool molten glass cones formed at the outlets of the orifices on the undersurface of the orifice plate 10 when the molten glass flowing out of the orifices are attenuated into filaments, as well as to eliminate stagnant gas disposed in close proximity to the orifice plate 10 and to provide a fresh supply of gas to the undersurface of the orifice plate 10 to compensate for the gas removed downwardly by the fibers drawn through the orifices.

The air nozzle apparatus 24 receives a supply of air from a pressurized air supply source, not shown, through air supply conduits or hoses 26 connected thereto.

Figure 2:
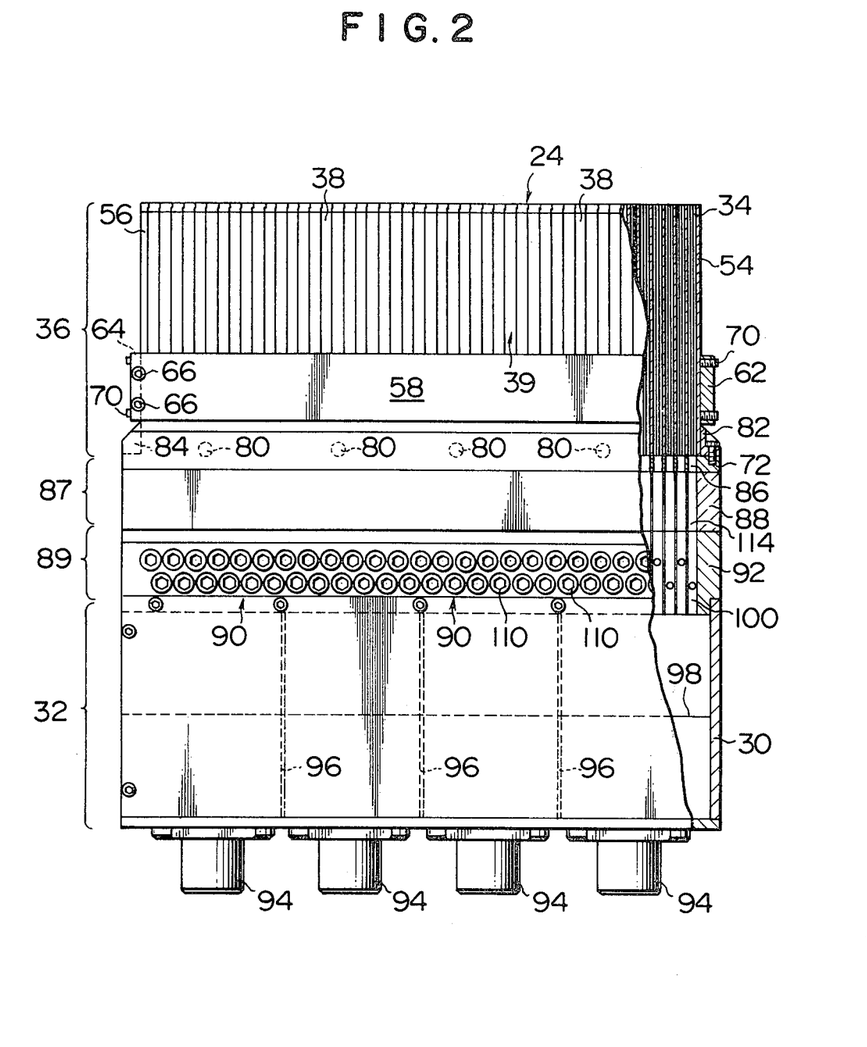
FIG. 2 is a front view, with certain parts being shown in section, of the air nozzle apparatus comprising a preferred embodiment of the invention.
Figure 3:
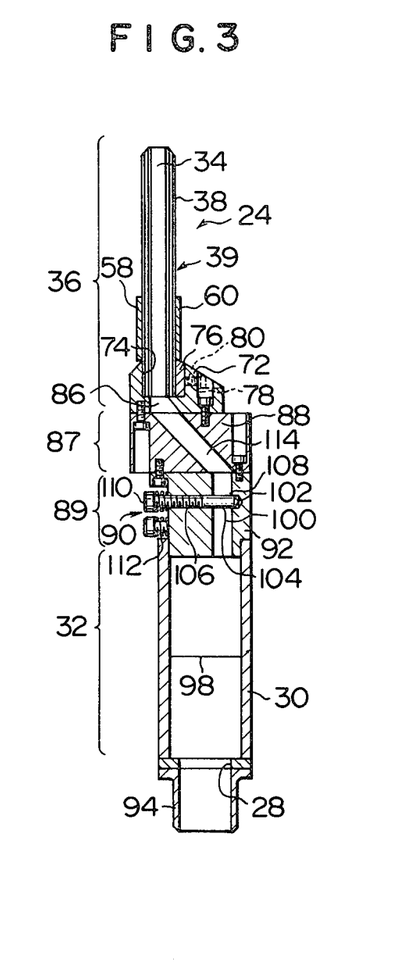
FIG. 3 is a vertical sectional view of the air nozzle apparatus shown in FIG. 2.
Figure 4:
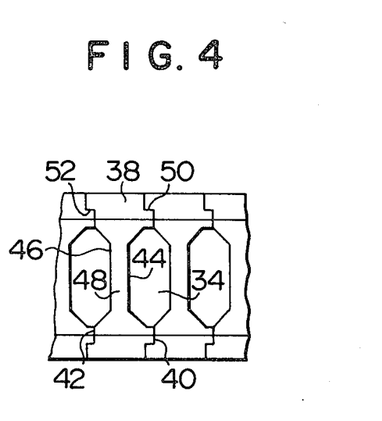
FIG. 4 is a fragmentary view, on an enlarged scale, of the nozzle block of the air nozzle apparatus shown in FIG. 2.

FIGS. 1-5 show the detailed construction of the air nozzle apparatus 24 according to the invention. The air nozzle apparatus 24 comprises an air introducing section 32 provided with a manifold 30 having air supply ports 28, and an air nozzle section 36 provided with a plurality of nozzle channels 34 communicating with the manifold 30. The air nozzle section 36 comprises a plurality of nozzle ribs 38 of substantially the same shape each having opposed side surfaces 40 and 42 as shown in FIG. 4, the nozzle ribs 38 being arranged to have their side surfaces 40 and 42 thereof located in adjacent relationship to provide a nozzle block 39. The opposed side surfaces 40 and 42 of each nozzle rib 38 are formed with longitudinally extending recesses 44 and 46, respectively, to define one of the nozzle channels 34 by the recess 44 of one of the adjacent two nozzle ribs 38 and the recess 46 of the other nozzle rib 38. It is only a partition wall 48 forming the bottom of the recesses 44 and 46 that exists between the adjacent two nozzle channels 34, so that the spacing interval between the nozzle channels 34 is minimized to increase the density of the number of air currents ejected through the nozzle channels 34.

Each nozzle rib 38 has first and second complementary interfitting means or perpendicularly stepped portions 50 and 52 formed on the opposed side surfaces 40 and 42, respectively. The stepped portions 50 and 52 of the adjacent side surfaces 40 and 42 are preferably tightly interfitted to integrate the nozzle ribs 38 into the nozzle block 39. The first and second interfitting means may be of some other form in place of the perpendicularly stepped portions, such as tilting stepped dovetail portions. In this case, separation of the nozzle ribs 38 from each other can be more positively prevented.

The recesses 44 and 46 formed in each nozzle rib 38 are shaped such that the nozzle channel 34 defined between the adjacent nozzle ribs 38 has an elongated octagonal shape in cross section extending in the same direction as the side surfaces 40 and 42. However the nozzle channels 34 are not limited to this specific cross-sectional shape and may have any other suitable cross-sectional shape, such as rectangular or other elongated poligonal shape, an elliptic shape or a circular shape.

The nozzle ribs 38 may be formed of metal, such as ordinary iron. In this case, the recesses 44 and 46 can be readily formed by grinding or extrusion working. Thus, the recesses 44 and 46 can be of any shape as desired to enable the cross-sectional shape of the nozzle channels 34 to be freely selected. The nozzle ribs 38 may be formed of any other suitable material than iron, such as stainless steel, aluminum alloy, etc. In this case also, the shape of the recesses 44 and 46 can be arbitrarily selected to enable the cross-sectional shape of the nozzle channels 34 to be freely selected.

The nozzle channels 34 are preferably shaped such that in cross section they have, as shown, an elongated shape extending in the same direction as the side surfaces 44 and 42. This enables the density of the nozzle channels 34 to be increased while the cross-sectional area thereof still remains unaltered thereby to enable the density of the number of the air currents to be increased. Moreover, by arranging the air nozzle section 36 in such a manner that a minor dimension of the cross section of each nozzle channel 34 is parallel to the longitudinal direction of the orifice plate 10 as described at page 4 of U.S. Pat. No. 4,159,200, it is possible to achieve uniform cooling effect over a wider range widthwise of the orifice plate 10 which corresponds to the direction of a major dimension of the nozzle channels 34. Thus, the dimensional range of the orifices arranged widthwise of the orifice plate 10 can be increased.

Figure 5:
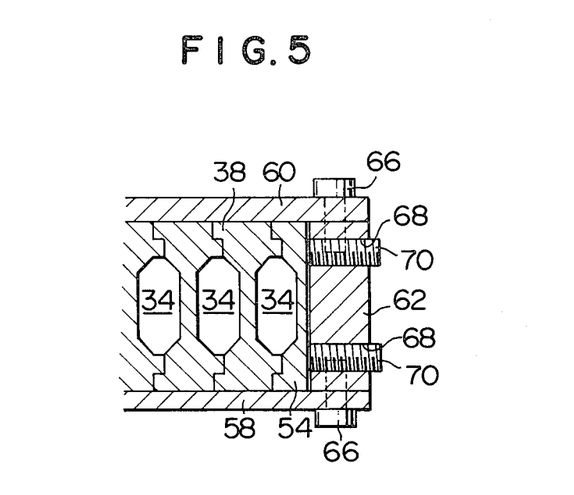
FIG. 5 is a sectional view of the holding means of the nozzle block of the air nozzle apparatus shown in FIG. 2, particularly showing a portion thereof at which the clamp plates are located at its end portion.

In the embodiment shown and described hereinabove, the opposed side surfaces 40 and 42 of each nozzle rib 38 are formed with the recesses, respectively. However, the same effects can be achieved by forming one recess in one of the side surfaces 40 and 42. The nozzle ribs 38 located at opposite ends only has one side surface that takes part in integration, so that as shown in FIG. 5, end ribs 54 and 56 may be provided at opposite ends of the air nozzle section 36 which include a flat surface on the side thereof at which no integration is effected.

The air nozzle section 36 of the air nozzle apparatus 24 of the aforesaid construction is provided with means for rigidly holding in place the nozzle block 39 formed by integrating the nozzle ribs 38 arranged in side-by-side relation. The holding means comprises a pair of keep plates 58 and 60 of iron located on opposite sides of the nozzle block 39, a pair of clamp plates 62 and 64 of iron located on opposite ends of the nozzle block 39 and bolts 66 for connecting the keep plates 58 and 60 and the clamp plates 62 and 64 together in the form of a box surrounding the nozzle block 39. The clamp plates 62 and 64 are each formed with four threaded apertures 68 to receive set screws 70 therein. Thus, by turning the set screws 70 and pressing the forward ends thereof against end faces of the end ribs 54 and 56 of the nozzle block 39, it is possible to clamp the clamp plates 62 and 64 against the nozzle block 39 to rigidly hold same in place.

The air nozzle section 36 of the aforesaid construction is also provided with a support block 72 formed of metal, such as ordinary iton, for supporting the nozzle block 39 of the side-by-side nozzle ribs 38. The support block 72 is formed with a recess 74 for receiving a lower end of nozzle block 38 which is open not only at its top but also at opposite ends thereof. The recess 74 can be formed as by machining with ease. The recess 74 has a widthwise dimension greater than the thickness of the nozzle block 39 to allow a spacer 76 to be fitted in an excess dimensional portion thereof as shown in FIG. 3. The spacer 76 is forced against the nozzle block 39 by the forward ends of set screws 80 threaded into four threaded apertures 78 formed in the support block 72 at right angles to the spacer 76 thereby to rigidly hold the lower end of the nozzle block 39. The recess 74 has a pair of positioning plates 82 and 84 bolted to opposite end portions thereof. The support block 72 is formed with passageways 86 each aligned with one of the nozzle channels 34 formed in the nozzle block 39. The support block 72 is bolted to a guide block 88 for effecting adjustment of positioning as subsequently to be described.

The manifold 30 of the air introducing section 32 is formed by bolting together sheet iron or other material to form a box-shaped member, and has nipples 94 bolted to the positions corresponding to the air supply ports 28 for connecting hoses 26. The air supply ports 28 and the nipples 94 of the embodiment shown and described hereinabove are each four in number, and the manifold 30 is divided into four compartments corresponding to the air supply ports 28 and the nipples 94 by three partition plates 96. The hoses 26 connecting the nipples 94 to an air supply source, not shown, are each provided with valve means, not shown, for controlling the flow rate of an air current flowing therethrough. By controlling the valve means independently of and separately from one another, it is possible to divide into corresponding four groups the flow rates of the air currents flowing through the nozzle channels 34 of the nozzle block 39 and effect control of same independently of and separately from one another. The numeral 98 designates a screen for removing foreign matter from the air currents.

The air nozzle apparatus 24 further comprises a valve section 89 interposed between the air introducing section 32 and the air nozzle section 36, and a guide section 87 interposed between the valve section 89 and the air nozzle section 36.

The valve section 89 includes a valve block 92 formed with a plurality of valve channels 100 maintaining the manifold 30 in communication with the nozzle channels 34, and a plurality of valve means 90 each for individually effecting fine adjustments of the flow rate of air flowing through one of the valve channels 100 independently of and separately from one another.

The valve block 92 which is preferably formed of ordinary iron is firmly secured to an upper end of the manifold 30 by bolts.

Figure 6:
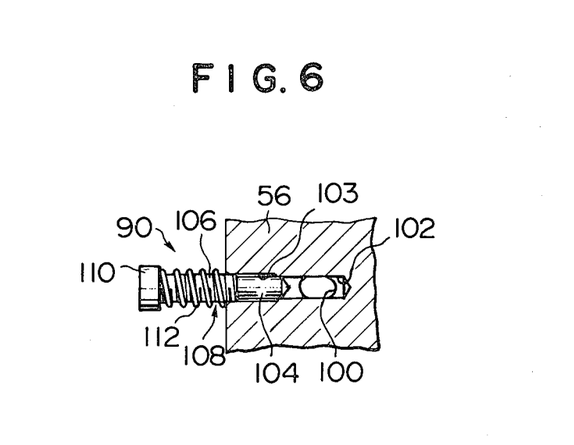
FIG. 6 is a sectional view, on an enlarged scale, of the vlave means of the air nozzle apparatus shown in FIG. 2.

As shown in FIG. 2, the valve channels 100 are spaced apart from one another by the same spacing interval as the nozzle channels 34, and the cross-sectional surface of the valve channels 100 is elliptic as shown in FIG. 6 so that they will have the same flow area as the nozzle channels 34. The major dimension of each nozzle channel 34 in cross-section is flush with the major dimension of the corresponding valve channel 100 in cross-section.

Each valve means 90 is preferably of a needle type and comprises, as shown on an enlarged scale in FIG. 6, a valve bore 102 formed in the valve block 92 in a manner to cross the corresponding valve channel 100, a needle valve 108 threadably fitted in the valve bore 102, and a head portion 110 for manipulating the needle valve 108 from outside. The valve bore 102 extends in a direction perpendicular to the minor demension of the corresponding valve channel 100 and has a diameter which is substantially equal to or slightly larger than the minor dimension of the valve channel 100. The valve bore 102 is formed with an internal thread 103 at its inlet portion. The needle valve 108 comprises a needle portion 104 of substantially the same diameter as the valve bore 102, and a thread portion 106 formed with an outer thread meshing with the inner thread of the valve bore 102. The needle valve 108 is preferably formed of stainless steel. By turning the head portion 110, the needle portion 104 of the needle valve 108 can be moved forwardly and backwardly in the valve bore 102 to alter the opening of the valve channel 100 thereby to effect fine adjustments of the flow rate of an air current flowing through the valve channel 100. Each needle type valve means 90 can make the diameter of the needle portion 104 substantially equal to or slightly larger than the diameter of the valve channel 100, thereby making it possible to obtain an overall compact size in a valve means and to arrange all the valve means 90 close to one another. Thus, the nozzle channels 34 can be essentially arranged close to one another.

Also, in the embodiment shown and described hereinabove, the valve means 90 are preferably arranged in two rows in staggered relation. This arrangement enables the number of the valve means 90 to be increased and allows the nozzle channels 34 to be arranged still more closely to one another.

A coil spring 112 may be mounted between the valve block 92 and the head 110 of each needle valve 108. The provision of the coil spring 112 absorbs play between the needle valve 108 and the valve bore 102 thereby to allow fine adjustments of the flow rate of the air current to be effected more positively.

The head portion 110 of each needle valve 108 is preferably as small as possible in size and formed with a hexagonal opening, for example, to enable the head portion 110 to be manipulated as with a wrench. This eliminates mutual interference of the heads 110 and interference of the tool and the head 110 that might otherwise occur when the valve means 90 are arranged close to one another.

In the embodiment shown and described hereinabove, the valve bore 102 is angled about 90 degrees with respect to the valve channel 100. However, the invention is not limited to this specific angle and the angle may be in the range between 70 and 110 degrees.

By utilizing the valve means, not shown, mounted in the hoses 26 referred to hereinabove, the flow rate of air is controlled by dividing the air currents ejected through the nozzle channels 34 into four groups. By utilizing the valve means 90, the air currents ejected through the nozzle channels 34 can be adjusted finely independently of and separately from one another. By this control system, the flow rates of the air currents ejected through the air nozzle apparatus 24 can be effectively controlled over a wide range.

The valve block 92 may be formed integrally with the manifold 30 as an extension thereof.

The guide section 87 comprises a guide block 88 formed with a plurality of guide channels 114 for maintaining each valve channel 100 in communication with one of the nozzle channels 34. The guide block 88 which is preferably formed of ordinary iron is firmly secured by bolts to the valve block 92 and supported thereon and the support block 72 is firmly secured to the guide block 88 by bolts and supported thereon. The guide channels 114 are each arranged such that an inlet portion thereof on the valve channel 100 side is displaced from an outlet portion thereof on the nozzle channel 34 side rearwardly of the air nozzle apparatus 24 or in a direction going toward the valve channel 100 from the manipulating portion of the valve means 90 or the head portion 110 of the needle valve 108. By this arrangement, the valve channels 100 are located rearwardly of the nozzle channels 34 and the communicating passageways 86 of the support block 72, so that the valve block 92 and the manifold 30 can be arranged rearwardly of the nozzle block 39 and the support block 72 as shown in FIG. 3. Thus, the head portions 110 of the needle type valve means 90 can be arranged in positions in which they are receding from the front side (left side as seen in FIG. 3) of the nozzle block 39 and the support block 72. Thus, the air nozzle apparatus 24 can, in operation as shown in FIG. 1, be arranged below the orifice plate 10 and substantially perpendicularly thereto without the risks of the head portions 110 of the valve means 90 coming into contact with the glass filaments being drawn through the orifices of the orifice plate 10.

The air nozzle apparatus 24 is usually located, as shown in FIG. 1, behind the glass filament group with the heads 110 of the valve means 90 facing the filaments and the length of the apparatus 24 agreeing with the length of the orifice plate 10, and manipulation of the valves has to be performed, with an elongated bolt wrench, for example, from the side of an operation passage which is juxtaposed against the air nozzle apparatus 24 while interposing the glass filament group therebetween. In this case, if projections such as the head portions 110 of the valve means 90 were located at the lower front side from the nozzle block 39, the air nozzle apparatus 24 as a whole have to be tilted to avoid contact between the projections and the filaments being drawn. If the air nozzle apparatus 24 were located in a tilting position, the air currents ejected from the nozzle block 39 would obliquely impinge on the undersurface of the orifice plate 10 and the air would be prevented from being supplied in enough quantities to a portion of the undersurface of the orifice plate 10 located rearwardly of the portion thereof on which the air currents impinge. Thus, nonuniform cooling of the undersurface of the orifice plate 10 would result.

The air nozzle apparatus 24 of the construction shown and described hereinabove can be mounted substantially perpendicularly to the orifice plate 10 in a position below same by virtue of the structure of the nozzle block 39. This permits the air currents ejected through the nozzle passages 34 to impinge on the undersurface of the orifice plate 10 substantially at right angles thereto, thereby minimizing the adverse influences exerted by induced air currents from the vicinity of the orifice plate 10 and allowing the undersurface of the orifice plate 10 and the molten glass cones to be uniformly cooled. This is conductive to obviation of the problem with which the prior art was faced that the air nozzle apparatus must be arranged in an inclined position.

Another preferred embodiment of the air nozzle apparatus in conformity with the invention will be described by referring to FIGS. 7-10.

The air nozzle apparatus of this embodiment is generally designated by the reference numeral 124 while parts or sections having constructions substantially similar to those of the first embodiment shown in FIGS. 1-6 are designated by like reference characters. More specifically, the air nozzle apparatus 124 comprises an air introducing section 32, a valve section 89 and a guide section 87 which are substantially of the same construction as the corresponding sections of the first embodiment, so that their description shall be omitted.

Figure 7:
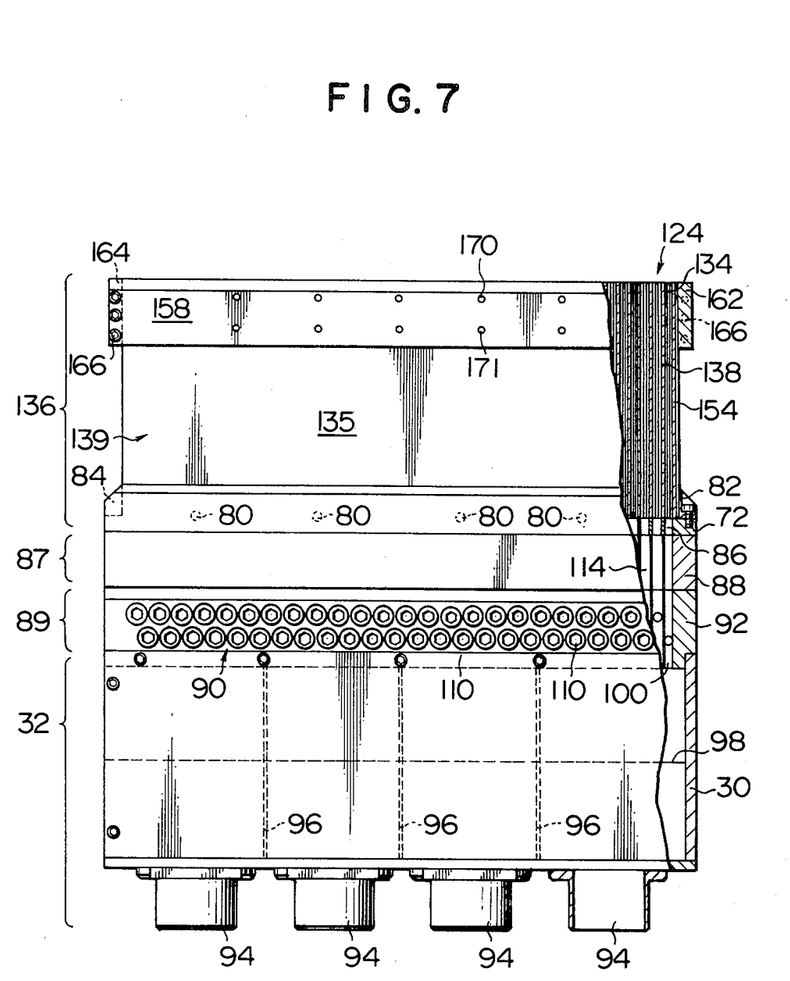
FIG. 7 is a front view, with certain parts shown in section, of the air nozzle apparatus comprising another preferred embodiment.
Figure 9:
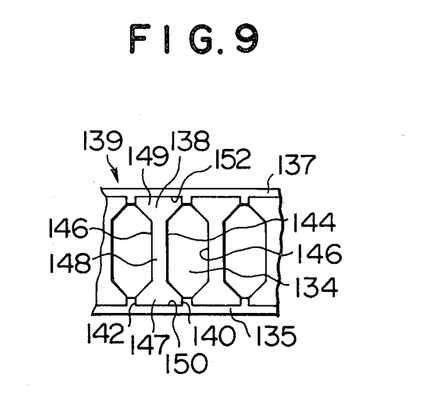
FIG. 9 is a fragmentary view, on an enlarged scale, of the forward end of the nozzle block of the air nozzle apparatus shown in FIG. 7.

The air nozzle apparatus 124 comprises an air nozzle section 136 which is formed with a plurality of nozzle channels 134 communicating with the manifold 30 of the air introducing section 32. The air nozzle section 136 comprises a plurality of nozzle ribs 138 of substantially the same shape each having opposed side surfaces 140 and 142 and opposed end edge portions 147 and 149, the nozzle ribs 138 being arranged to have their side surfaces 140 and 142 located in adjacent relationship. The air nozzle section 136 further includes a pair of parallel guide plates 135 and 137 located adjacent the opposed end edge portions 147 and 149 of the nozzle ribs 138 so that the plurality of nozzle ribs 138 and the pair of guide plates 135 and 137 constitute a nozzle block 139. The opposed side surfaces 140 and 142 of each nozzle rib 138 is formed with longitudinally extending recesses 144 and 146, respectively, to define one of the nozzle channel 134 between the adjacent two nozzle ribs 138. As shown, it is only a partition wall 148 forming the bottom of the recesses 144 and 146 that exists between the adjacent nozzle channels 134 so that the spacing interval between the nozzle channels 134 is minimized to increase the density of the number of air currents ejected through the nozzle channels 134.

The end edge portions 147 and 149 of each nozzle rib 138 are in the form of square projections constituting first interfitting means. The guide plates 135 and 137 are formed with complementary square recesses 150 and 152 or second interfitting means which are located parallel to each other in a plurality of numbers. The nozzle ribs 138 and the guide plates 135 and 137 are integrated into a nozzle block 139 with the end edge portions 147 and 149 of the nozzle ribs 138 and the recesses 150 and 152 of the guide plates 135 and 137 being interfitted tightly. The first and second interfitting means may be in the form of dovetail projections and recesses in place of the square projections and recesses. By using this form of interfitting means, separation of the guide plates 135 and 137 and the nozzle ribs 138 from each other can be more positively prevented. Alternatively the guide plates 135 and 137 may be formed on their inner surfaces with projections as one of the first and second interfitting mean while the end edge portions 147 and 149 of the nozzle ribs 138 may be formed with complementary recesses as the other of the interfitting means.

The recesses 144 and 146 formed in each nozzle rib 138 are shaped such that nozzle channel 134 defined between the adjacent nozzle ribs 138 in cooperation with the guide plates 135 and 137 has an elongated octagonal shape in cross section extending in the same direction as the side surfaces 140 and 142 of the nozzle ribs 138. However, the invention is not limited to this specific form of the nozzle channels, and the nozzle channels may be each in the form of an elongated polygon, such as an elongated rectangle, in cross-sectional shape. If possible, they may be elliptic or circular in cross-sectional shape.

The nozzle ribs 138 and the guide plates 135 and 137 may be formed of ordinary iron. In this case, the recesses 144 and 146 of the nozzle ribs 138 can be readily formed by grinding or extrusion working. Thus the recesses 144 and 146 can be of any shape as desired to enable the cross-sectional shape of the nozzle channels to be freely selected. The nozzle ribs 138 and the guide plates 135 and 137 may be formed of any other suitable material than iron, such as stainless steel, on aluminum alloy, etc. In this case also, the shape of the recesses 144 and 146 of the nozzle ribs 138 can be arbitrarily selected to enable the cross-sectional shape of the nozzle channels 134 to be freely selected.

The nozzle channels are preferably shaped such that in cross section they have an elongated shape extending in the same direction as the side surface 140 and 142 of the nozzle ribs 138. This enables the density of the nozzle channels 134 to be increased while the cross-sectional area still remains unchanged thereby to enable the density of the number of air currents to be increased. Moreover, by arranging the air nozzle section 136 in such a manner that a minor dimension of the cross section of each nozzle channel 134 is parallel to the longitudinal direction of the orifice plate 10 as described at page 4 of U.S. Pat. No. 4,159,200, it is possible to achieve uniform cooling effects over a wide range widthwise of the orifice plate 10 which corresponds to direction of a major dimension of the nozzle channels 134. Thus, the dimensional range of the orifices arranged widthwise of the orifice plate 10 can be increased.

Figure 10:
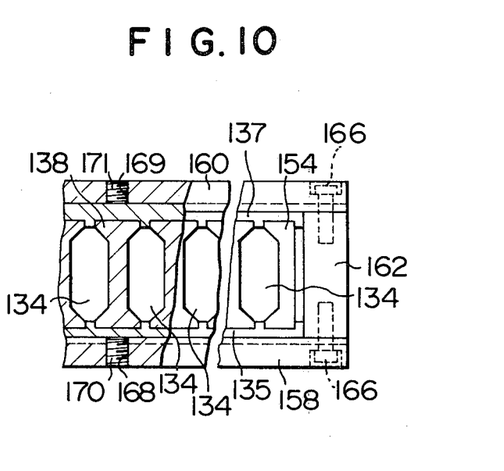
FIG. 10 is a sectional view of the clamp plates and the keep plates of the holding means for holding an end portion of the nozzle block of the air nozzle apparatus shown in FIG. 7.

In the embodiment shown and described hereinabove, the opposed side surfaces 140 and 142 of each nozzle rib 138 are formed with recesses 144 and 146, respectively. However, the same effects can be achieved by providing one recess in one of the side surfaces 140 and 142. The nozzle ribs 138 located at opposite ends only has one side surface that is integrated with other nozzle rib 138 to form the nozzle channel 134, so that as shown in FIG. 10, end ribs 154 and 156 (only one is shown) may be provided which include a flat surface with no recess on the side thereof at which no nozzle channel is formed by integration with other nozzle rib.

In the embodiment shown and described hereinabove, the air nozzle section 136 is provided with means for rigidly holding in place the nozzle block 139 formed by integrating the nozzle ribs 138 with the guide plates 135 and 137 parallel to each other. The holding means comprises a pair of clamp plates 158 and 160 formed of iron located on opposite sides of the nozzle block 139 in juxtaposed relation to the guide plates 135 and 137, respectively, and a pair of keep plates 162 and 164 of iron located at opposite end portions of the nozzle block 139. The clamp plates 158 and 160 and the keep plates 162 and 164 are connected together in the form of a box by bolts 166 in a manner to surround the nozzle block 139. The clamp plates 158 and 160 are formed with rows of threaded apertures 168 and 160 respectively, one row having five threaded apertures, and set screws 170 and 171 are fitted in the respective rows of threaded apertures 168 and 169. By turning the set screws 170 and 171 to press at their forward ends against the surfaces of the guide plates 135 and 137, respectively, of the nozzle block 139, it is possible to clamp against the nozzle block 139 and rigidly hold same in place.

Figure 8:
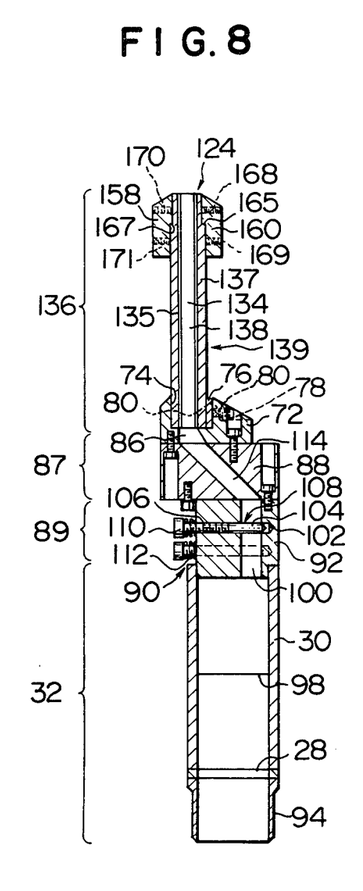
FIG. 8 is a vertical sectional view of the air nozzle apparatus shown in FIG. 7.

The guide plates 135 and 137 are each formed with a stepped portion 165 parallel to the upper end faces thereof in portions surrounded by the clamp plates 158 and 160, as shown in FIG. 8, while the clamp plates 158 and 160 are each formed on inner surfaces thereof with a complementary stepped portion 167, so that the stepped portions 165 and 167 cooperate with each other to avoid dislodging of the clamp plates 158 and 160. The set screws 170 are set on the upper side of the stepped portions 165 and 167 and the set screws 171 are set on the lower side thereof.

In place of using the aforesaid holding means, the nozzle ribs 138 in suitable positions are preferably replaced by blocks having no recesses, and the guide plates 136 and 137 may be directly bolted to opposed end edge portions of such blocks.

Like the air nozzle section 36 of the first embodiment, the air nozzle section 136 of the embodiment shown and described hereinabove is provided with a support block 72 for supporting the nozzle block 139 which is substantially of the same construction as the support block 72 of the first embodiment, so that the description thereof shall be omitted.

As apparent from foregoing, in the air nozzle apparatus according to the invention, the air nozzle section comprises a plurality of nozzle ribs of substantially the same shape arranged to have their side surface located in adjacent relationship to constitute a nozzle block, the nozzle ribs each being formed on at least one of the opposed side surfaces with a longitudinally extending recess which defines one of nozzle channels between the adjacent nozzle ribs. Thus, a partition wall constituting the bottom of the recesses only exists between the nozzle channels, so that the spacing interval between the nozzle channels can be reduced to arrange the nozzle channels close to one another, so that the density of the number of air currents ejected through the nozzle channels can be increased to enable satisfactory effect to be achieved in cooling the orifice plate. Moreover, the recesses in the nozzle ribs can be formed in any shape as desired by grinding, extrusion working or shaping, so that the cross-sectional shape of the nozzle channels can be freely selected. Also, such working of the nozzle ribs to form the recesses is very easy, and a rectangular recess has only to be formed in a support block for supporting same and connecting same to the manifold, so that production and assembling of the air nozzle apparatus can be facilitated.

In the air nozzle apparatus according to the invention, the valve means for individually effecting fine adjustments of air currents ejected through the nozzle channels independently of and separately from one another are each in the form of a needle type valve means including a needle valve threadably fitted in a valve bore. Thus, the valve means are simple in construction and compact in size thereby to enable the valve means to be arranged close to one another, so that density of the number of air currents ejected through the nozzle channels can be essentially made possible by arranging the nozzle channels close to one another in a valve section.

In the air nozzle apparatus according to the invention, the valve means of the aforesaid constructions are arranged in two rows in staggered relation. This enables the number of the valve means to be increased, and this feature is also conductive to the provision of a valve section making it essentially possible to increase the density of the number of air currents ejected through the nozzle channels.

In the air nozzle apparatus according to the invention, the guide section is interposed between the air nozzle section and the valve section, and the guide section includes a plurality of guide channels formed in the guide block each constructed such that an inlet portion thereof on the valve channel side is displaced from an outlet portion thereof on the nozzle channel side in a direction oriented from the manipulating portion of the valve means for actuating same from outside toward the associated valve channel. This structural feature enables the valve means to be arranged in a manner to recede from the air nozzle section, so that the air nozzle apparatus can be mounted below the orifice plate substantially perpendicular thereto without the risks of the filaments being drawn through the orifices of the orifice plate coming into contact with the manipulating portions of the valve means. Therefore, the air currents ejected through the nozzle channels of the air nozzle apparatus can be made to impinge on the undersurface of the nozzle plate substantially perpendicular thereto to eliminate the adverse influences which might otherwise be exerted on the filaments being drawn by the induced air currents from the vicinity of the orifice plate, thereby enabling the undersurface of the orifice plate to be cooled quite uniformly.

What is claimed is:

1. An air nozzle apparatus for directing air flow against the undersurface of an orifice plate of a glass fiber drawing forehearth, comprising: an air introducing section including a manifold formed with at least one air supply port; and an air nozzle section formed with a plurality of nozzle channels communicating with the manifold, said air nozzle section including a plurality of nozzle ribs of substantially the same shape each having opposed side surfaces and opposed end edge portions, said plurality of nozzle ribs being arranged to have their side surfaces located in adjacent relationship to provide a nozzle block, said nozzle ribs each being formed on at least one of the opposed side surfaces with a longitudinally extending recess which defines one of said plurality of nozzle channels between the adjacent nozzle ribs.

2. An air nozzle apparatus as claimed in claim 1, wherein said nozzle ribs of said air nozzle section each include first and second complementary interfitting means formed on the respective opposed side surfaces of each said nozzle rib, said first and second interfitting means on the adjacent side surfaces of the adjacent nozzle ribs being in engagement with each other to integrate the nozzle ribs into said nozzle block.

3. An air nozzle apparatus as claimed in claim 2, wherein said first and second interfitting means comprise perpendicularly stepped portions formed in close proximity to edge portions of the opposed side surfaces of each said nozzle rib.

4. An air nozzle apparatus as claimed in claim 2, wherein said recess is formed on each of the opposed side surfaces of each said rib.

5. An air nozzle apparatus as claimed in claim 2, wherein each said nozzle channel defined by the recess of the adjacent nozzle ribs has an elongated cross-sectional shape oriented in the same direction as the side surfaces of the nozzle ribs.

6. An air nozzle apparatus as claimed in claim 2, wherein said air nozzle section further includes means for rigidly holding in place said nozzle block, said holding means including a pair of keep plates located on opposed sides of the nozzle block, a pair of clamp plates located at opposed end edge portions of the nozzle block and connected to said keep plates in the form of a box surrounding the nozzle block, and screw members threadably engaged in threaded apertures formed in the clamp plates to engage end faces of the nozzle block at their forward ends to clamp against same.

7. An air nozzle apparatus as claimed in claim 1, wherein said air nozzle section further includes a pair of parallel guide plates located adjacent the opposed end edge portions of said nozzle ribs arranged to have their side surfaces located in adjacent relationship, said nozzle ribs and said guide plates including first and second complementary interfitting means formed at the end edge portions of each said nozzle rib and on the inner surface of each said guide plate, respectively, said first and second interfitting means being in engagement with each other to integrate the nozzle ribs into the guide block.

8. An air nozzle apparatus as claimed in claim 7, wherein said first interfitting means comprises a square projection formed at each end portion of each said nozzle rib and said second interfitting means comprises a complementary square recess formed on the inner surface of each said guide plate.

9. An air nozzle apparatus as claimed in claim 7, wherein said recess is formed on each of the side surfaces of the nozzle ribs.

10. An air nozzle apparatus as claimed in claim 7, wherein each said nozzle channel defined by the recess of the adjacent nozzle ribs has an elongated cross-sectional shape oriented in the same direction as the side surfaces of the nozzle ribs.

11. An air nozzle apparatus as claimed in claim 7, wherein said air nozzle section further includes means for rigidly holding in place said nozzle block, said holding means including a pair of clamp plates located on opposed sides of the nozzle block, a pair of keep plates located at opposed end edge portions of the nozzle block and connected to said clamp plates in the form of a box surrounding the nozzle block, and screw members threadably engaged in threaded apertures formed in said clamp plates to engage at their forward ends the outer surfaces of the guide plates of the nozzle block to clamp against same.

12. An air nozzle apparatus as claimed in claim 1, further comprising a valve section interposed between said air introducing section and said air nozzle section, said valve section including a valve block formed with a plurality of valve channels each allowing the manifold to communicate with one of the plurality of nozzle channels, and a plurality of valve means each associated with one of the valve channels, said valve means each including a valve bore formed in the valve block in a manner to cross the corresponding valve channel, and a needle valve threadably inserted in each said valve bore, the needle valves each having a head portion capable of being manipulated from outside to actuate the needle valves.

13. An air nozzle apparatus as claimed in claim 12, wherein each said valve means further includes a coil spring mounted between the valve block and the head portion of each said needle valve.

14. An air nozzle apparatus as claimed in claim 12, wherein the head portion of each said needle valve is formed with an opening for allowing the head portion to be manipulated by means of a wrench.

15. An air nozzle apparatus as claimed in claim 12, wherein the manifold is divided into a plurality of compartments by means of partition plates, said compartments each being formed with said air supply port.

16. An air nozzle apparatus as claimed in any one of claims 12-14, wherein said valve means are arranged in two rows in staggered relation.

17. An air nozzle apparatus as claimed in claim 1, further comprising a valve section interposed between said air introducing section and said air nozzle section, said valve section including a valve block formed with a plurality of valve channels each allowing the manifold to communicate with one of the plurality of nozzle channels, and a plurality of valve means each associated with one of the valve channels, said valve means being arranged in two rows in staggered relation.

18. An air nozzle apparatus as claimed in claim 1, further comprising a valve section interposed between said air introducing section and said air nozzle section, and a guide section interposed between said valve section and said air nozzle section, said valve section including a valve block formed with a plurality of valve channels communicating with the manifold, and a plurality of valve means each associated with one of said valve channels and having a manipulating portion for manipulating said valve means from outside, and said guide section including a guide block formed with a plurality of guide channels each allowing one of the plurality of valve channels to communicate with one of the plurality of nozzle channels, each said guide channel being arranged such that an inlet portion thereof on the valve channel side is displaced from an outlet portion thereof on the nozzle channel side in a direction going toward the valve channel from the manipulating portion of the valve means.

* * * * *